Jan. 4, 1938.                K. UMLAUFF                2,104,213
HYDRAULIC FORWARD AND REVERSE DRIVE
Filed Dec. 24, 1936
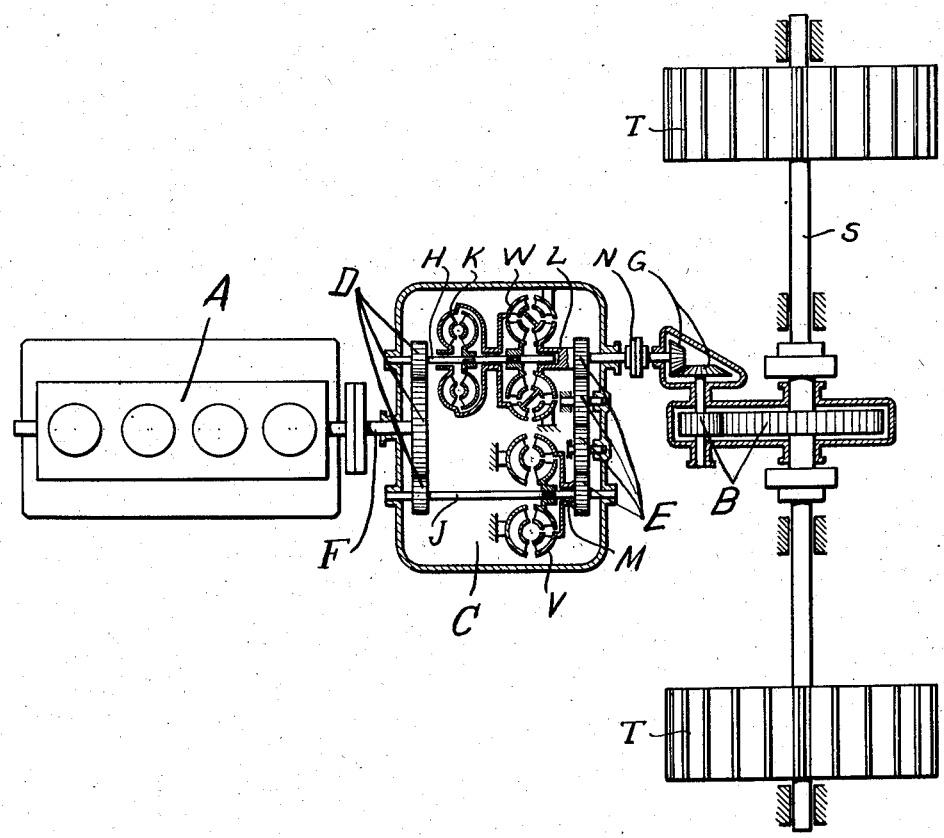
Karl Umlauff
Inventor
Saulnier & Saulnier
Attorneys Patented Jan. 4, 1938

2,104,213

UNITED STATES PATENT OFFICE 2,104,213

HYDRAULIC FORWARD AND REVERSE DRIVE

Karl Umlauff, Berlin-Charlottenburg, Germany, assignor to J. M. Voith, Heidenheim-on-the-Brenz, Germany, a copartnership composed of Walther Voith, Hermann Voith and Hanns Voith Application December 24, 1936, Serial No. 117,623
In Germany December 21, 1935

4 Claims. (Cl. 60—54)

This invention relates to driving mechanisms for self-propelled carriers, such as paddle wheel ships, and in particular, to such carriers as are operated by internal combustion engines in connection with hydraulic transmissions.

One object of this invention is to provide a drive for self-propelled carriers, wherein an internal combustion engine is connected to the propelling shaft through the intermediate agency of a hydraulic transmission comprising at least one hydraulic torque converter with a hydraulic coupling.

Another object is to provide such a drive, wherein the hydraulic transmission includes a pair of hydraulic torque converters on independent shafts, one of these torque converters being connected to rotate the propelling shaft in a reverse direction from the rotation imparted by the other torque converter.

Another object is to provide such a drive, wherein the hydraulic transmission contains a pair of hydraulic torque converters and a hydraulic coupling, one of these torque converters being on an independent shaft arranged to rotate the propelling shaft in a reverse direction from the other torque converter and hydraulic coupling so that the propelling shaft may be reversed by filling one of the torque converters and emptying the other torque converter or its coupling without requiring the reversal of the engine, and enabling the full torque of the engine to be applied immediately to the reversing operation.

Another object is to provide a drive as set forth in the preceding paragraph, wherein one torque converter and one hydraulic coupling are mounted on one shaft and the other torque converter is mounted upon another shaft, both shafts being operatively connected to the engine, but one converter shaft having mechanism connecting it to the propelling shaft in such a manner as to cause the propelling shaft to rotate in a reverse direction from the rotation imparted by the other torque converter or hydraulic coupling.

The drawing shows a plan view, partly in section, of a drive for operating a propelling shaft from an internal combustion engine in accordance with the present invention.

Referring to the drawing in detail, there is shown an internal combustion engine A, which is connected through an engine shaft F and a special hydraulic transmission C to a propelling shaft S, by way of bevel gearing G and ordinary gearing B. The propelling shaft S carries a pair of wheels T for propelling the carrier. These wheels T, for example, may be paddle wheels for a ship. The hydraulic transmission C receives power from the engine shaft F through gearing D, connected to parallel shafts H and J. Mounted on the shaft H are the interconnected primary rotors or pump wheels of a hydraulic coupling K and a hydraulic torque converter W. The secondary rotors of this coupling and torque converter are connected to the tubular output shaft L. Similarly, the shaft J carries the primary rotor or pump wheel of a hydraulic torque converter V, the secondary rotor or turbine element of which is connected to the tubular output shaft M. The stationary guide wheels of the torque converters W and V are anchored by being secured to the casing of the transmission C, as shown in the drawing.

The tubular output shafts L and M are interconnected by gearing E in such a manner that the hydraulic torque converter V will rotate the shaft L in an opposite direction from the rotation imparted thereto by the torque converter W or hydraulic coupling K when the engine A is running in the same direction. The tubular output shaft L terminates in a coupling N, by which it is connected to the bevel gearing G and straight gearing B, previously mentioned. The torque converter W and hydraulic coupling K on the shaft H are utilized for forward travel, whereas the torque converter V on the shaft J is utilized for travel in a reverse direction. It is understood that the hydraulic coupling K and the torque converters W and V may be filled with or emptied of fluid independently of each other by employing any suitable filling and emptying means (not shown). It is this filling and emptying of these respective units which causes each to become operative or inactive, respectively.

In the operation of the invention, let it first be assumed that the self-propelled carrier is to be operated in a forward direction. The engine A is started and the torque converter W is filled with fluid. When the input and output torques of the torque converter W have become approximately equal, the operator empties the torque converter W and simultaneously fills the hydraulic coupling K so that the driving connection is now made through the hydraulic coupling K. When this has been accomplished, the engine A is directly connected to the propelling shaft S, through the gearing D, the shaft H, the hydraulic coupling K, the tubular output shaft L and the gearing G and B. As a hydraulic coupling has an efficiency of about 98 per cent., there is but a small slip in speed occurring within the hydraulic coupling K. The change-over point from the torque converter W to the hydraulic coupling K occurs at about two-thirds of the normal speed of the propelling shaft S.

When the torque converter W is first put in operation, with the propelling shaft S at a standstill, the output torque is at a maximum. As the propelling shaft S begins to rotate the output torque decreases as the speed of the driven member increases. When the propelling shaft S is driven from the engine A, through the hydraulic coupling K, the speed of the propelling shaft S is regulated by varying the speed of the engine A. In this manner the speed of the wheels T varies directly in proportion to the speed of the engine A because of the almost complete freedom from slippage within the hydraulic coupling K.

When it is desired to reverse the direction of travel, the engine A is allowed to continue to rotate in its usual direction, but the operator empties the hydraulic coupling K and fills the hydraulic torque converter V with fluid. As a result power is no longer transmitted between the shafts H and L, but the power transmission now takes place over the shaft J and through the torque converter V, to the shaft M. The gearing E, however, causes the shaft L to rotate in the opposite direction from its previous direction of rotation, hence, the propelling shaft S is first gently braked by the hydraulic cushioning action and then reversed instantly when it has ceased its rotation in a forward direction. Since it is unnecessary to reverse the direction of rotation of the engine, the full engine output and increased torque at the wheels K can be utilized for reversing. Accordingly, this reversal can be effected in a very short time, a fact which is of the utmost importance in navigation. The torque converter W is employed only temporarily for starting or for running in a forward direction with heavy loads, requiring an unusually large torque. The torque converter V is used only for travel in a reverse direction. As a consequence, the somewhat lower efficiencies of the torque converters W and V exert no great influence during the period of normal operation, which is of course, operation in a forward direction.

This idling speed is easily obtained, even with the torque converter W filled, because at very low speeds very little load is transmitted by the torque converter W. When the engine comes up to its running speed and the load is placed upon it, with the propelling shaft S at a standstill, the primary rotor of the torque converter W causes the secondary rotor thereof to develop a torque on the propelling shaft S which is a multiple of the torque applied by the engine on the primary rotor of the torque converter W. The output torque decreases with the increasing rotational speed of the propelling shaft S.

Due to the use of torque converters with a hydraulic coupling in this invention, a better overall efficiency is obtained than is possible with a Diesel electric drive. At the same time an efficiency is obtained which is substantially equal to that of all-mechanical power transmission systems, but at the same time a slight elasticity is provided by the fluid transmission which damps oscillations in the power transmission system, as well as the torque variations in the propelling shaft S. The invention also makes it possible to utilize the full engine output and to have available an increased torque upon the propelling shaft S for starting and reversing. The drive automatically adapts itself to the engine speed because the action of the hydraulic torque converters correlates the engine speed and the propelling shaft speed in accordance with the resistance encountered in travel. The necessity of stopping the engine or of reversing it during maneuvers is also eliminated, and no additional reversing device is required. The hydraulic torque converters and coupling exert a cushioning effect which gives a smoothness of running and a resiliency of action, which reduce wear on the moving parts and decrease vibration.

In the so-called Föttinger transformers previously in use in ship drives, these transformers served the purpose only of effecting a speed reduction between a fast-running steam engine and a slow-running propeller shaft. These transformers were used only temporarily, and their installation was discontinued when the gear designing art had developed to such a stage that suitable gears could be produced for reducing the speed between the steam engine and the propeller shaft. Occasionally also hydraulic couplings were installed between the engine and the mechanical gearing in order to safeguard the mechanical gearing. The present invention, however, utilizes torque converters for forward and reverse travel, together with a hydraulic coupling for forward travel when the speed has reached a predetermined value.

I claim as new:

1. In a driving mechanism for self-propelling carriers driven by internal combustion engines, an engine shaft, a pair of intermediate shafts operatively connected to said engine shaft for rotation thereby, a propelling shaft, a hydraulic torque converter on each intermediate shaft, and each having its input side connected to its respective intermediate shaft, and means connecting the output sides of said hydraulic torque converters with said propelling shaft and arranged to rotate said propelling shaft in opposite directions relatively to said engine shaft, one of said torque converters being connected to drive said propelling shaft forwardly from said engine shaft up to a predetermined speed and having a hydraulic coupling associated therewith, said hydraulic coupling being connected to selectively take over the drive from said associated torque converter beyond said predetermined speed.

2. In a driving mechanism for self-propelling carriers driven by internal combustion engines, an engine shaft, a pair of intermediate shafts operatively connected to said engine shaft for rotation thereby, a propelling shaft, a hydraulic torque converter on each intermediate shaft, and each having its input side connected to its respective intermediate shaft, means connecting the output sides of said hydraulic torque converters with said propelling shaft and arranged to rotate said propelling shaft in opposite directions relatively to said engine shaft, one of said torque converters being connected to drive said propelling shaft forwardly from said engine shaft up to a predetermined speed and having a hydraulic coupling associated therewith, said hydraulic coupling being connected to selectively take over the drive from said associated torque converter beyond said predetermined speed, and means for selectively operating either of said torque converters at a given time.

3. In a driving mechanism for self-propelled carriers driven by internal combustion engines, an engine shaft, a propelling shaft, connecting mechanism including a pair of intermediate shafts interposed between said engine shaft and said propelling shaft, and a hydraulic torque converter on each of said intermediate shafts, one of said torque converters being connected to drive said propelling shaft forwardly from said engine shaft up to a predetermined speed and having a hydraulic coupling associated therewith, said hydraulic coupling being connected to selectively take over the drive from said associated torque converter beyond said predetermined speed.

4. In a driving mechanism for self-propelled carriers driven by internal combustion engines, an engine shaft, a propelling shaft, a pair of intermediate shafts, mechanism driven by said engine shaft for rotating said intermediate shafts, a hydraulic torque converter on each of said intermediate shafts, a hydraulic coupling connected to one of said torque converters, said coupling-connected torque converter being connected to drive said propelling shaft forwardly from said engine shaft up to a predetermined speed, and said coupling being connected to selectively take over the drive from said coupling-connected torque converter beyond said predetermined speed, and mechanism connecting said torque converters with said propelling shaft for rotating said propelling shaft in opposite directions.

KARL UMLAUFF.